Aug. 5, 1969   S. S. FOUSE ETAL   3,459,874
BUS DUCT HAVING ANGULARLY ADJUSTABLE SECTIONS
Filed June 24, 1966   4 Sheets-Sheet 1

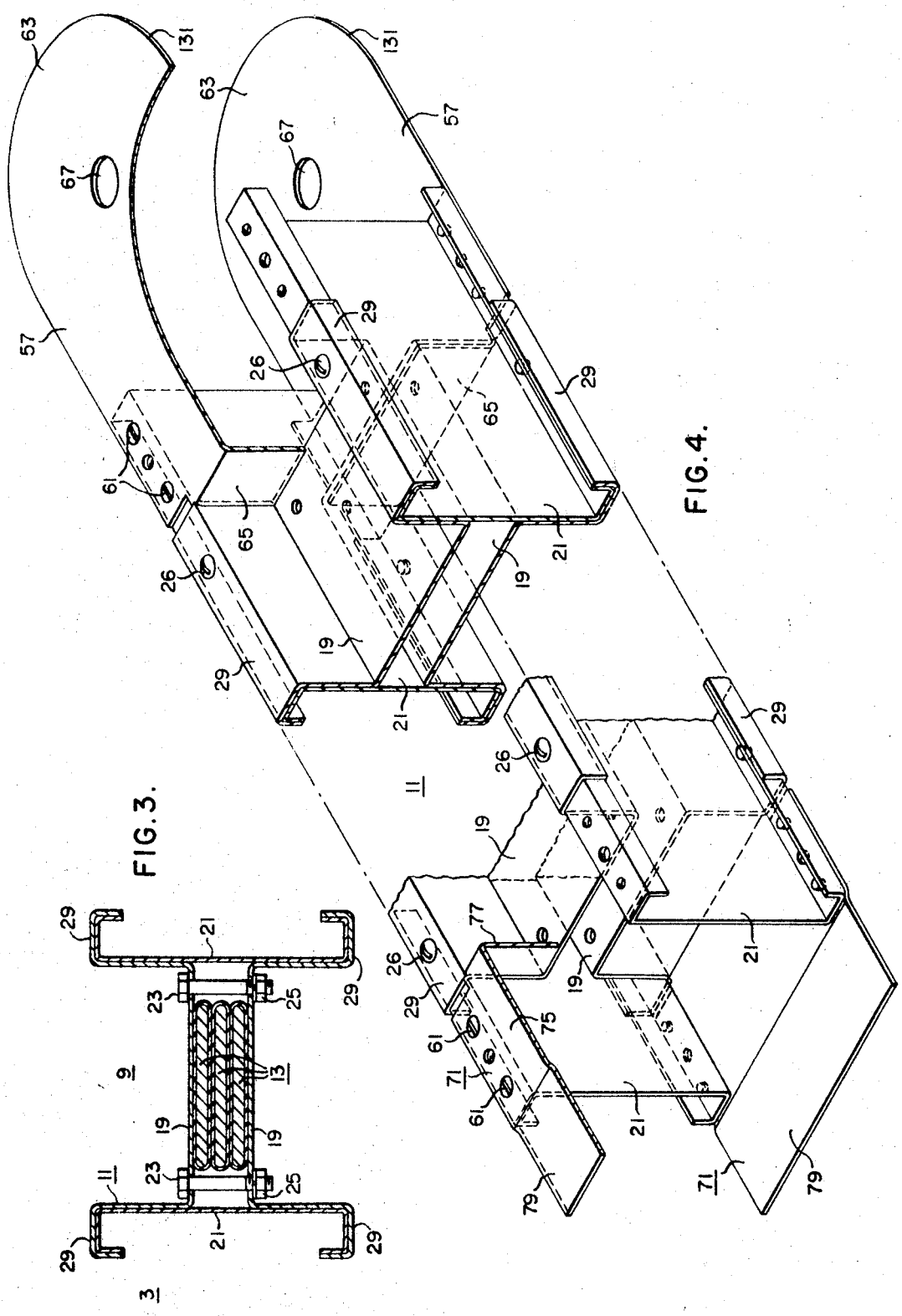

United States Patent Office

3,459,874
Patented Aug. 5, 1969

3,459,874
BUS DUCT HAVING ANGULARLY ADJUSTABLE SECTIONS
Samuel S. Fouse, Aliquippa, and Charles L. Weimer, Beaver Falls, Pa., assignors to Westinghouse Electric Corporation, Pittsburgh, Pa., a corporation of Pennsylvania
Filed June 24, 1966, Ser. No. 560,304
Int. Cl. H02g 15/08
U.S. Cl. 174—86    8 Claims

ABSTRACT OF THE DISCLOSURE

Bus duct is constructed such that a section can be connected to a similar section as either a straight length connection or angle-type connection.

---

Bus duct is generally manufactured in unit sections, approximately 10 feet in length, which sections are connected together at the installation. In order to avoid the expenses and problems incurred in manufacturing elbow-type sections for certain connections wherein different angular configurations are needed, it is desirable to provide bus duct constructed such that a section can be connected to a similar section as either a straight length of bus duct or at an angle.

Accordingly, an object of this invention is to provide improved bus duct constructed such that two straight-length sections can be connected at an angle in an end-to-end relationship.

Another object of this invention is to provide improved bus duct constructed such that a section can be connected to a similar section to form either a straight length connection or an angle connection.

A further object of this invention is to provide improved bus duct constructed such that two sections can be connected at any of a plurality of possible angles.

Another object of this invention is to provide an improved one-bolt joint type of bus duct section that can be connected to a similar section of bus duct to form either a straight length connection or an angle connection.

These atnd other objects of the invention will become more apparent from the following detailed description when considered in connection with the attached drawings.

In said drawings:

FIG. 3 is a sectional view, with parts broken away, taken generally along the line III—III of FIG. 1;

FIG. 4 is a perspective view, with parts in section and with parts broken away, of part of the houseing structure of the bus duct section seen in FIGS. 1 and 2;

Figure 5:
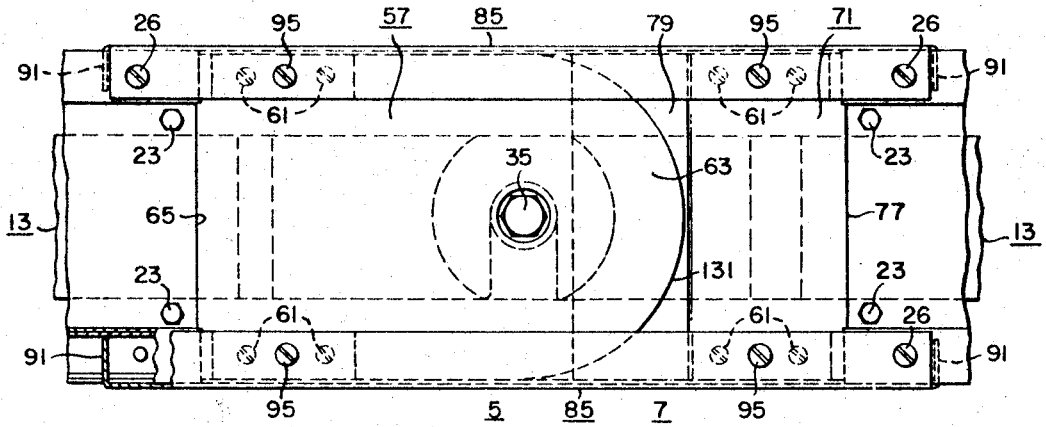
FIG. 5 is a top plan view of parts of two sections of bus duct, of the type seen in FIGS. 1 and 2, connected together as a straight length.
Figure 6:
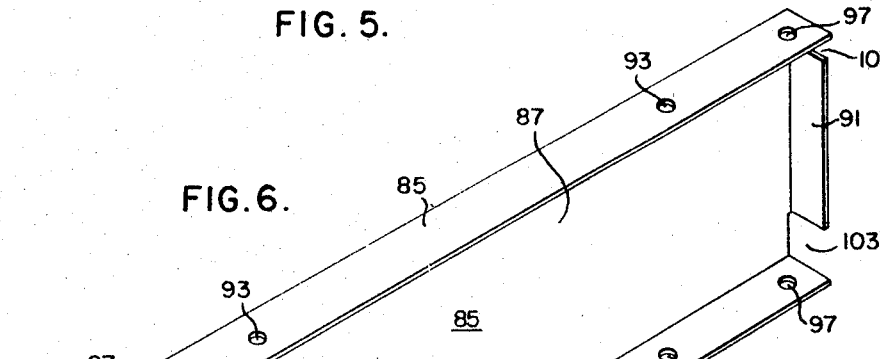
FIG. 6 is a perspective view of one of the two cover members seen in FIG. 5.
Figure 7:
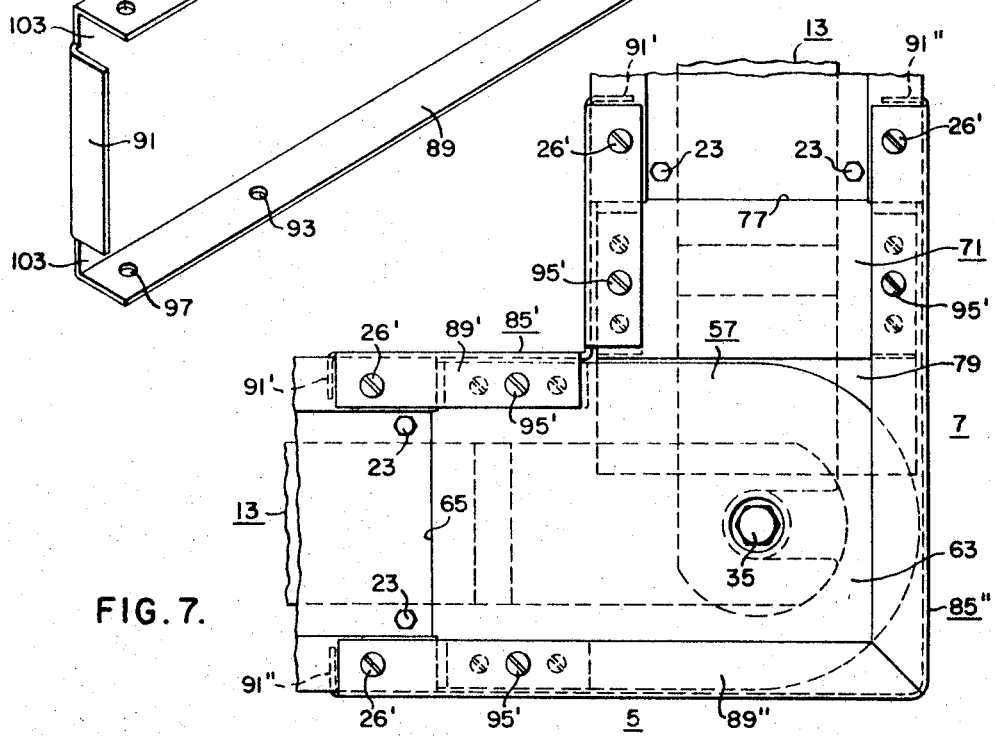
Figure 8:
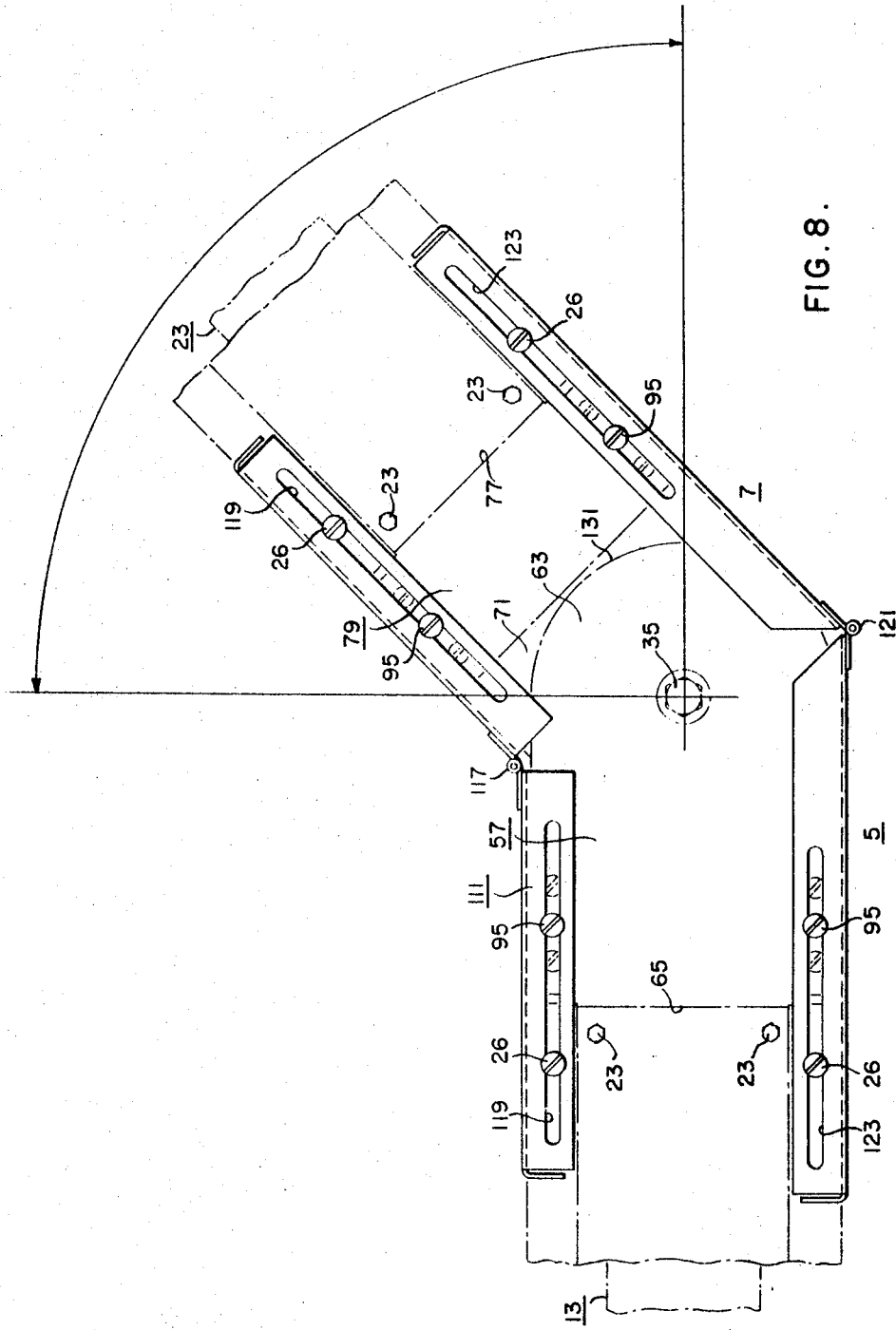

FIG. 7 is a view similar to FIG. 5, illustrating a right-angle connection of two sections of bus duct with additional angle-type housing cover members that are different from the cover members seen in FIGS. 5 and 6; and FIG. 8 is a top plan view of another embodiment of the invention illustrating, in broken lines, parts of two similar sections connected at a 45° angle and, in full lines, two hinge-type housing cover members that complete the housing structure at the connection.

Figure 2:
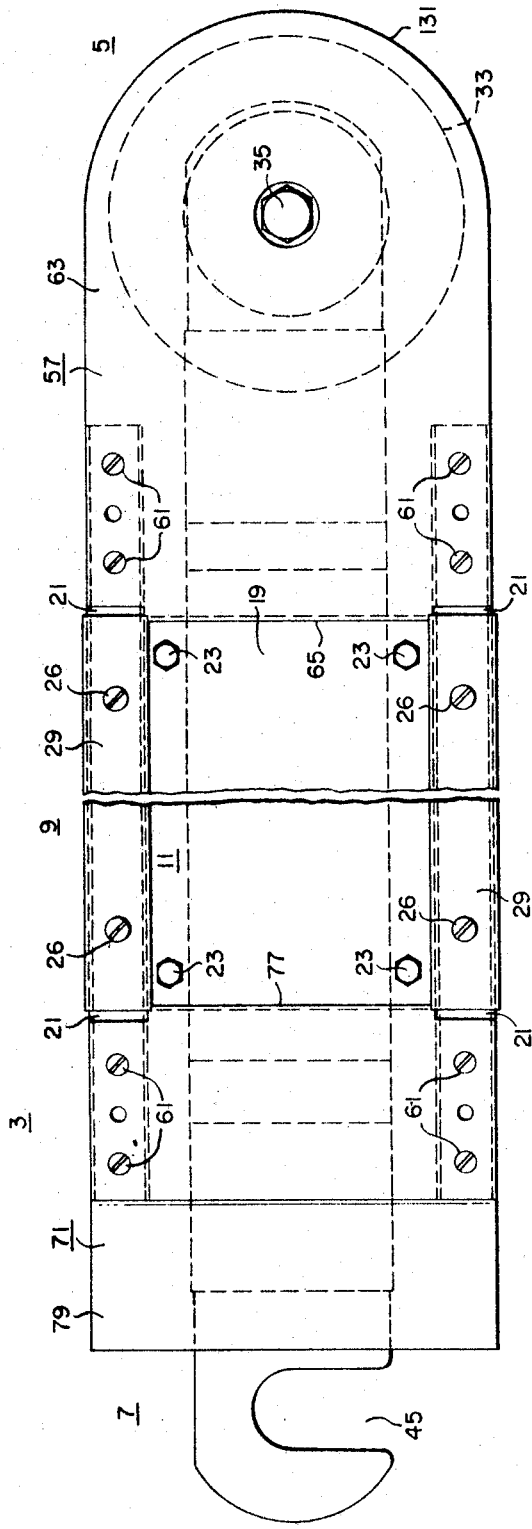
FIG. 2 is a top plan view of the section of bus duct seen in FIG. 1.
Figure 1:
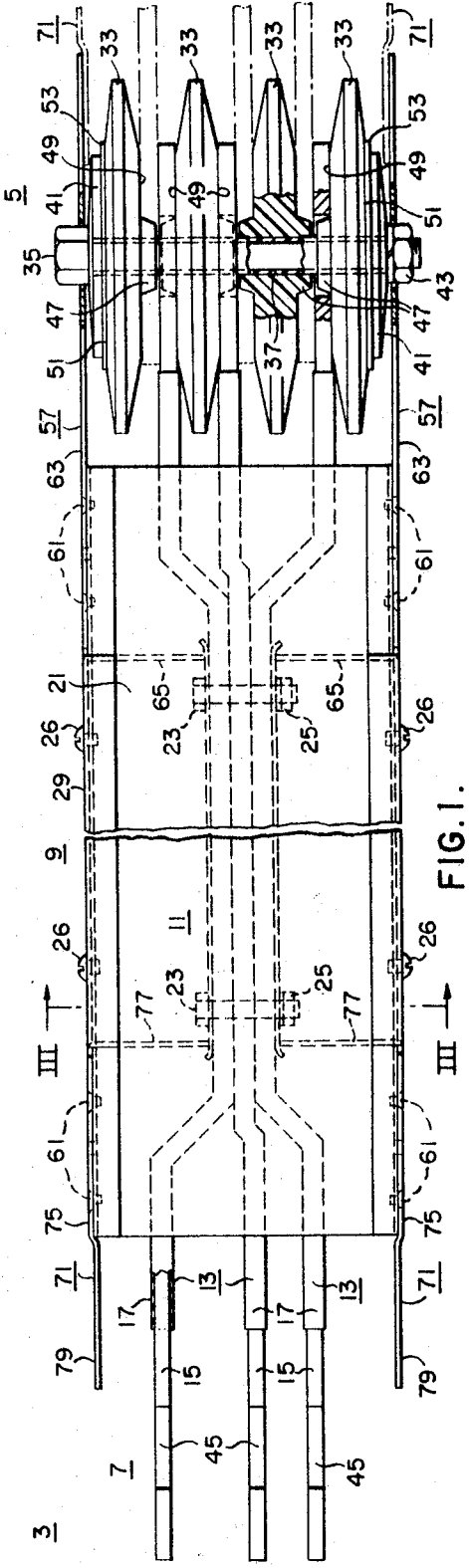
FIGURE 1 is a side view, with parts in section and with parts broken away, of a section of bus duct constructed in accordance with principles of this invention.

Referring to the drawings, there is disclosed, in FIGS. 1 and 2, an elongated section 3 of bus duct comprising a first connecting-end part 5, a second connecting-end part 7 and a main-body part 9 intermediate the end parts 5 and 7. The section 3 comprises a housing structure 11 and a plurality of flat bus bars 13 supported in the housing structure 11 in a stacked mutually flatwise face-to-face relationship. Each of the bus bars 13 comprises a conducting bar 15 and an insulating sleeve 17 supported on the conducting bar 15. As can be seen in FIG. 3, the housing structure 11, at the main-body part 9, comprises a first pair of oppositely disposed housing members 19 and a second pair of oppositely disposed housing members 21. Each of the housing members 19 is a generally U-shaped member with the main leg parts thereof bent over to extend outwardly and then bent over to extend back parallel to the main leg parts. A plurality of bolts 23 are passed through suitable openings in the bight portions of the members 19, and nuts 25 are threaded onto the bolts 23 to draw the members 19 toward each other to thereby sandwich the bus bars 13 between the members 19. The housing members 19 are good heat-conducting members of aluminum to dissipate heat from the bus bars. The C-shaped housing members 21 are disposed between the members 19 in a nested relationship as seen in FIG. 3. The housing members 19 are held in place by means of the frictional engagement between the members 19 and 21, and also by means of screws 26 (FIGS. 1 and 2). The members 21 are mechanically rigid members of steel for increased structural strength. The housing members 19, 21 form four generally U-shaped channel parts 29 positioned at the four corners of an imaginary rectangle as shown in FIG. 3. The channel parts 29 provide increased aluminum surface area for heat dissipation and they also provide a structure that cooperates with a plurality of different hanger structures for supporting the bus duct in a plurality of different orientations. The main body part housing construction is more specifically described in the co-pending patent application of Charles L. Weimer et al., Ser. No. 560,129, filed June 24, 1966 and assigned to the assignee of the instant application. Thus, only a brief description of this construction is given herein.

As can be seen in FIGS. 1 and 2, the housing and bus bars of the section 3 at the main-body part 9 are constructed and arranged as disclosed in FIG. 3 with the bus bars packed in a compact arrangement between the housing parts 19. The bus bars are offset at the opposite ends thereof to provide adequate space between the bars for connection to bus bars of another similar section in an overlapping relationship and to provide space for insulation between adjacent sets of connected bus bars at the connection. The bus bars 15 are provided with aligned openings therein at the connecting-end part 5. A plurality of insulating members 33 are supported at the connecting-end part 5. Each of the insulating members 33 is a rigid molded disc-shaped insulating member having an opening therein. A bolt 35 and insulating tube 37 extend through the bus bar openings and through the openings in the insulating members 33. Two spring washer members 41 are provided at the outer sides of the insulating members 33. A nut 43 is threaded on the free end of the bolt 35. Each of the bus bars 15 is provided with a slot 45 at the connecting-end part 7 of the section 3 which slots extend transversely and are open at the side as shown in FIG. 2. When it is desired to connect the section 3 to a similar section of bus duct, the slot end 7 cooperates with the bolt end 5. The slot end of a similar section of bus duct is shown in broken lines in FIG. 1. In order to connect the sections, the slot end is moved into position with the slots 45 straddling the bolt 35 and insulating tube 37, and with the uninsulated ends of the bus bars of one section being in an overlapping relationship with the uninsulated ends of the bus bars of the other section. The nut 43 and bolt 35 are then tightened squeezing the spring washers 41 toward each other to force the insulators 33 and bus bars 15 together to physically and electrically connect the overlapped bus bars of the two sections of bus duct. As can be seen in FIG. 1, the two center insulators 33 are provided with integral insulating parts 47 that extend into the openings of the bus bars on the opposite sides of each of the insulators. Each of the upper and lower insulators 33 is provided with one integral insulating part 47 that extends into the bus bar that the insulator contacts. The parts 47 provide increased insulation between adjacent pairs of connected bus bars. Each of the insulating members 33 is a rigid insulating member having a flat surface 49 where the insulator engages the flat surface of a bus bar. Each of the center insulators 33 has a pair of flat surfaces 49 at the opposite sides thereof and each of the outer insulators 33 has at least one flat surface 49 where it engages the bus bar. Each of the outer insulators 33 has flat surface 51 that is engaged by a flat metallic washer member 53 that is provided between the spring washer 41 and the member 33 to evenly distribute the pressure of the spring washer on the member 33. In order to loosen the connection, the bolt 35 and nut 43 are loosened and the slotted end of the one section is removed from the connected position.

Referring to FIG. 1, it will be seen that the bus bars 15 are supported in a compact relationship (FIG. 3) through the length of the bus duct section at the main-body part 9 of the bus duct section 3. As was prveiously described, the bus bars are offset at the opposite ends to enable connection of the bus bars to bus bars of a similar section of bus duct and to provide space for the insulating members that insulate adjacent pairs of overlapping connected bus bars from each other at the connection. Thus, the housing 11 is provided with constructions at the opposite ends thereof that are different from the construction of the housing at the main-body part of the section. As is best seen in FIGS. 1, 2 and 4, a pair of plate members 57 are provided at the connecting-end part 5 on opposite sides of the housing. The aluminum housing parts 19 terminate just short of the offsets of the bus bars 15 at the opposite ends of the section and the steel housing parts 21 extend past the housing parts 19 at the opposite ends of the section. Each of the plate members 57 is secured to the channel parts 29 of the opposite steel housing members 21 by means of a plurality of screws 61. Each of the plate members 57 comprises a first generally planar part 63 and a bent-over generally planar part 65 that extends normal to the part 63 to engage the bight portion of the associated housing member 19. An opening 67 is provided in each of the plate members 57 to receive the bolt head of the bolt 35 and the nut 43 as seen in FIG. 1. A pair of plate members 71 at the other end 7 of the section 3 are similarly secured to the channel parts 29 of the opposite steel housing members 21 by means of a plurality of screws 61. Each of the plate members 71 comprises a planar part 75 and a bent-over planar part 77 that extends downwardly, normal to the part 75, to engage the bight portion of the associated housing member 19. Each of the plate members 71 is bent-over inwardly to provide an offset end part 79 that will underlap with the associated plate 57 at the connection in the manner shown in broken lines in FIG. 1. As can be seen in FIGS. 1 and 5, when the sections are brought together the parts 79 of the plates 71 underlap with the parts 63 of the plates 57 to close off two opposite sides of the bus duct housing at the connection.

As will be understood with refernece to FIGS. 1, 2, 4, 5 and 7, the housing members 21 terminate at the opposite ends of the section 3 short of the ends of the plates 57 and 71 and short of the ends of the bus bars 15 to permit one of the sections to be moved transversely of the other at the connection so that the transverse slots 45 can receive he bolt 35 and tube 37, and also to permit the sections to be connected as a right angle connection as shown in FIG. 7. The sections are shown connected as a straight length in FIG. 5 and at a right angle in FIG. 7. It can also be understood that the sections could be connected at a right angle with one of the sections rotated 90°, about the axis of the bolt 35, from the position shown in FIG. 7. In order to close off the opposite sides of the housing structure 11 at the connection, additional housing cover members are provided.

A straight-length housing cover member 85 is disclosed in FIG. 6. The housing member 85 is a sheet steel member comprising a main wall part 87, opposite flange parts 89 and opposite flange parts 91. Openings 93 are provided in the parts 89 to receive screws 95 (FIG. 5) that connect the cover plate member 85 with the plates 57 and with the channel parts 29 of the housing members 21. Openings 97 are provided in the parts 89 for receiving screws 26 (FIG. 5) that connect the members 85 to the channel parts 29 of both of the housing members 19 and 21. The plate 85 is provided with slot portions 103 (FIG. 6) for receiving the channel parts 29 of the housing structure 11. The flange parts 91 extend inward to the housing members 21 to close off the housing openings at the connection. At the straight-length connection shown in FIG. 5 two of the housing cover members 85 are provided at the opposite sides of the connection. As can be seen in FIG. 5, the connecting-end part 7 of the section on the right is connected to the connecting-end part 5 of the section on the left. The plate member 71 of the section on the right cooperates with the plate member 57 of the section on the left with the part 63 of the plate member 57 overlapping the part 79 of the plate member 71 to close off one side of the housing structure at the connection. The housing structure at the opposite side (not shown) is closed off in the same manner as that seen in FIG. 5. The plate members 85 cooperate in the manner shown to close off the other two opposite sides to provide a complete enclosure at the connection.

Referring to FIG. 7, there is disclosed therein parts of two sections of bus duct connected as a right-angle connection. The connecting-end part 7 of one section is connected to the connecting-end part 5 of the other section. All of the parts of the sections disclosed in FIG. 7 are identical to those parts of the sections connected and disclosed in FIG. 5 except the cover plate members which close off the opening at the two opposite sides of the connection. A cover member 85′ is similar to the cover member 85 except that the cover member 85′ is formed as an angle member. The cover member 85′ is mounted on the bus duct housing in the same manner as that described with reference to FIG. 5. Another cover member 85″ is similar to the cover member 85 except that the cover member 85″ is formed as an angle member. The cover member 85″ is mounted on the other side of the bus duct housing in the same manner as that described with reference to FIG. 5. As can be seen in FIG. 7, the part 63 of the plate 57 overlaps the part 79 of the plate 71 to close off the upper side of the housing structure. The bottom side of the housing structure at the connection is closed off by the overlapping parts 63, 79 of the bottom plates 57, 71 in the same manner.

It can be understood that the connection disclosed in FIG. 7 could be made with the connecting end 7 of the one section being in a right-angle position rotated 180° from the position shown in FIG. 7. In this case, the inner angle cover member 85′ would be moved to the other side, which would be the inner side of the angle, and the outer angle cover member 85″ would be moved to the other side, which would be the outer side of the angle.

Referring to FIG. 8, parts of two sections are disclosed therein in broken lines in a connected position with different cover members 111 and 113 being disclosed in full lines to illustrate cover members that can be used with the sections when it is desirable to connect the sections at any of a plurality of different angles. The connecting-end part 7 of one section is connected to the connecting-end part 5 of the other section in the same manner as was hereinbefore described. Only the cover members 111 and 113 are changed. As will be understood with reference to FIG. 8, the cover member 111 is constructed like the cover member 85 (FIG. 6) except that the cover member 111 is provided with a hinge structure 117 and with elongated slots 119 on both sides of the hinge structure and in both of the upper and lower flange parts of the cover member. The cover member 113 is like the cover member 85 (FIG. 6) except that the cover member 113 is provided with a hinge structure 121 and with elongated slots 123 on both sides of the hinge structure and in both of the upper end lower flange parts of the cover member. When the sections are connected in the manner disclosed in FIG. 8, the sections are rotated to the desired position and the bolt member 35 can then be tightened in the same manner hereinbefore described to physically and electrically connect the bus bars. The housing members 111 and 113 are then moved into position with the hinges 117, 121 permitting adjustment to fit the angular position of the connected sections. Thereafter, the screws 26 and 95 are screwed in place to complete the installation of the members 111, 113, and the connection of the bust duct sections is complete. It can be understood that the sections could be adjusted to any of the angular positions indicated by the arc in FIG. 8 by merely loosening the bolt 35 and screws 26, 95; positioning the sections and then tightening the bolt 35 and screws 26, 95. During rotation of one of the sections the screws 26, 95 move in the slots 119, 123.

If it is desired to connect the sections in an angular position in the opposite direction, with the connecting-end part 7 of the one section rotated in a counterclockwise direction from a straight position to any angular position up to 90°, the angle-type housing cover members 111 and 113 will be interchanged to keep the inner cover member 111 at the inner side of the angle and to keep the outer cover member 113 at the outer side of the angle. As will be understood with reference to FIG. 8, the part 63 of each of the upper and lower plate members 57 overlaps the associated part 79 of the associated plate member 71 to close the upper and lower sides of the housing structure at the connection in the same manner hereinbefore described.

As can be seen in FIGS. 2, 4, 5, 7 and 8, the plate member 63 is curved at 131 to provide clearance for the housing parts 77 and 113 when the sections are connected in any of the described angular positions.

From the foregoing, it can be understood that there is provided by this invention improved bus duct with improved means for connecting two straight-length sections at an angle. The sections can also be connected as a straight-length connection. A bolt structure and suitable insulating means are supported at one end of a section, and the bus bars at the other end of the section are provided with transverse slots. When two sections are to be connected, the sections are moved to move the bolt structure into the slots and to position the bus bars of the sections in an overlapping relationship with a rigid insluator between each pair of overlapped bus bars and with rigid insulators between the outermost bus bars and the opposite housing plate members. The single bolt structure is then tightened to draw the outer insulators toward each other to thereby physically and electrically connect the overlapped bus bars of the two sections. The transverse slots form hook-type structures at the one end of the bus bars, and, when the bolt structure is loosened, one or both of the sections can be rotated about the axis of the bolt to position the two sections at an angle. The bolt structure can then be tightened to again physically and electrically connect the bus bars. The hook-type slotted construction serves to better capture the sections together particularly when one or both of the sections is rotated.

The bus duct housing is constructed to support the bus bars at the main-body part of the section in a compact mutually flatwise face-to-face relationship. The bus bars are offset at the opposite ends of the section to provide for the overlapping type of connection and to provide adquate space for the insulators that are positioned between adjacent overlapped bus bars. In order to allow for the additional space required at the connection, the housing structure comprises plate members that are supported at opposite sides of the housing and spaced at the connection to enclose the spaced bus bars and insulating members. The plate members at one end of the section are offset to underlap with the associated plate members of the other end of the other section at the connection.

Two oppositely disposed side housing members terminate short of the connection in order to permit the connection to be made at any of a plurality of different possible angles. Thus, additional side housing cover members are needed to close off the openings at the connection. In one embodiment, cover members with a fixed construction (FIGS. 5–7) are utilized, with straight-length type cover members (FIGS. 5 and 6) used at straight length connections and with right-angle type cover members (FIG. 7) used at right-angle connections. In another embodiment, the cover members are hinged (FIG. 8) so that the same cover members can be used at either straight length connections or at any of a plurality of different angle-type connections. The hinged cover members are provided with elongated slots so that the same mounting screws, that are positioned at fixed parts of the housings, can be used to secure the hinged cover members to the housings at any of a plurality of different angular positions.

Since numerous changes may be made in the above-described construction, and because different embodiments of the invention may be made without departing from the spirit and scope of the invention, it is intended that all matter contained in the foregoing description or shown in the accompanying drawings shall be interpreted as illustrative and not in a limiting sense.

We claim as our invention:

1. A pair of elongated sections of bus duct, each of said sections comprising a housing and a set of a plurality of generally flat bus bars supported within the housing in a stacked mutually flatwise face-to-face relationship, each of said sections comprising a connecting end part, connecting means connecting said sections at the connecting end parts thereof at an angle with each bus bar of a first of said sections being in an operlapping relationship with a bus bar of the second of said section, said bus bars of said first section having aligned openings therein, said bus bars of said second section having aligned open slots therein, a plurality of rigid insulating members at the connection, said plurality of insulating members comprising a separate outer insulating member on each of two opposite sides of said bus bars and a separate inner insulating member between each pair of adjacent non-connected bus bars, each of said insulating members having an opening therein, said connecting means comprising bolt means extending through said openings in said insulating members and through said openings in said bus bars of said first section and through said slots in said bus bars of said second section, said bolt means biasing said outer insulating members toward tach other to thereby connect said plurality of insulating members and said bus bars in a compact relationship, said housing of said first and second sections comprising cooperating plate parts overlapping at said two opposite sides of said bus bars to close off said two opposite sides at said connection, each of said housings comprising a pair of opposite side walls terminating short of the connecting-end part of the section to provide open sides at said connection to permit rotation of one of said sections about the axis of said bolt means to a plurality of angular positions when said bolt means is not tightened, and two hinged side cover members mounted on said housings at said connection to close said side openings at said connection.

2. An elongated section of bus duct, said section comprising a first connecting-end part at one end thereof and a second connecting-end part of the other end thereof, said section comprising a housing, a set of a plurality of generally flat bus bars supported within said housing in a stacked mutually flatwise face-to-face relationship, said bus bars having alinged openings therein at said first connecting-end part, bolt means extending through said aligned openings, each of said bus bars at said second connecting-end part having an open slot therein, said section being connectable with a similar section with said section extending normal to said similar section to form a right-angle connection and with the bus bars of the second connecting-end part of the similar section in overlapping relationship with the bus bars of the first connecting-end part of said section and with said bolt-means of said section in the slots of the bus bars of the similar section in which position said bolt means may be tightened to draw said bus bars toward each other to provide contact pressure between said overlapped bus bars, said housing of said section comprising a first pair of opposite sides and a second pair of opposite sides, said housing of said section comprising a first pair of opposite plate parts at said first pair of opposite sides at said first connecting-end part, said housing of said section comprising a second pair of opposite plate parts at said first pair of opposite sides at said second connecting-end part, said first and second pairs of plate parts being cooperable plate parts such that at said connection of said section with a similar section each plate part of said first pair of plate parts overlaps with a separate plate part of said second pair of plate parts whereby said overlapping plate parts cooperable to provide cover at said first pair of opposite side at said connection, said section being connectable with said similar section such that when said bolt means is not tightened said section can be rotated about the axis of said bolt means and relative to said similar section to any desired angular position between said right-angle position and a straight end-to-end position, and a pair of hinged cover members connected to said section to cooperate with said housings of said section and said similar section to provide cover at said second pair of opposite sides at said connection when said sections are connected in any of said angular postions.

3. An elongated section of bus duct according to claim 2, and said slots in said bus bars at said second second connecting-end part being alinged transverse slots open at one side of said section whereby when said section is connected to said similar section said bus bars will receive said bolt means in said slots with a hook-type orientation between said bus bars of said similar section and said bolt means of said section.

4. A pair of connected elongated sections of bus duct each of said sections comprising a housing and a set of a plurality of generally flat bus bars supported within the housing in a stacked mutually flatwise face-to-face relationship, each of said sections comprising a connecting end part, connecting means connecting said sections at the connecting end parts thereof at an angle with each bus bar of a first of said sections being in an overlapping relationship with a bus bar of the second of said sections, said bus bars of said first section having aligned openings therein, said bus bars of said second section having aligned open slots therein, a plurality of rigid insulating members at the connection, said plurality of insulatng members comprising a separate outer insulating member on each of two opposite sides of said bus bars and a separate inner insulating member between each pair of adjacent non-connected bus bars, each of said insulating members having an opening therein, said connecting means comprising bolt means extending through said openings in said insulating members and through said openings in said bus bars of said first section and through said slots in said bus bars of said second section, said bolt means biasing said outer insulating members toward each other to thereby connect said plurality of insulating members and said bus bars in a compact relationship, said housings of said first and second sections comprising cooperating plate parts overlapping at said two opposite sides of said bus bars to close off said two opposite sides at said connection, said housing of said first section comprising a first pair of plate parts at said two opposite sides at the connecting end part thereof, said housing of said second section comprising a second pair of plate parts at said two opposite sides at the connecting end part thereof, said bolt means being supported on said first section, said first pair of plate parts having opening means therein aligned axially with said bolt means to provide access to said bolt means, at said connection each plate part of said first pair of plate parts overlapping with a separate plate part of said second pair of plate parts such that said overlapping plate parts provide cover at said two opposite sides at said connection, one of said sections being movable relative to the other of said sections about the axis of said bolt means when said bolt means is not tightened to permit connection of said sections in a plurality of angular positions, and each plate part of said first pair of plate parts having a curved end surface to provide cover at said two opposite sides without increasing the overall dimensions of said housing.

5. A pair of connected elongated sections of bus duct according to claim 4, and said slots in said bus bars of said second section being aligned transverse slots open at a side by said second section whereby said bus bars of said second section receive said bolt means in said slots with a hook-type orientation.

6. An elongated section of bus duct, said section comprising a first connecting-end part at one end thereof and a second connecting-end part at the other end thereof, said section comprising a housing, a set of a plurality of generally flat bus bars supported within said housing in a stacked mutually flatwise face-to-face relationship, said bus bars having aligned openings therein at said first connecting-end part, bolt means extending through said aligned openings, each of said bus bars at said second connecting-end part having an open slot therein, said section being connectable with a similar section with said section extending normal to said similar section to form a right-angle connection and with the bus bars of the second connecting-end part of the similar section in overlapping relationship with the bus bars of the first connecting-end part of said section and with said bolt-means of said section in the slots of the bus bars of the similar section in which position said bolt means may be tightened to draw said bus bars toward each other to provide contact pressure between said overlapped bus bars, said housing of said section comprising a first pair of opposite sides and a second pair of opposite sides, said housing of said section comprising a first pair of opposite plate parts at said first pair of opposite sides at said first connecting-end part, said housing of said section comprising a second pair of opposite plate parts at said first pair of opposite sides at said second connecting-end part, said first and second pairs of plate parts being cooperable plate parts such that at said connection of said section with a similar section each plate part of said first pair of plate parts overlaps with a separable plate part of said second pair of plate parts whereby said overlapping plate parts cooperate to provide cover at said first pair of opposite sides at said connection, said first pair of opposite plate parts at said first connecting-end part extending past said bolt means and having opening means therein aligned axially with said bolt means to provide access to said bolt means, said section being connectable with said similar section such that when said bolt means is not tightened said section can be rotated about the axis of said bolt means relative to said similar section to any desired angular position between said right-angle position and a straight end-to-end position, and each plate part of said first pair of plate parts having a curved end surface to provide cover at said two opposite sides without increasing the overall dimensions of said housing.

7. An elongated section of bus duct according to claim 6, said slots in said bus bars at said second connecting-end part being aligned transverse slots open at one side of said section.

8. An elongated section of bus duct according to claim 6, said slots in said bus bars being aligned transverse slots open at one side of said section.

References Cited

UNITED STATES PATENTS 3,004,097 10/1961 Johnston et al.
3,104,276 9/1963 Cataldo et al.

DARRELL L. CLAY, Primary Examiner

U.S. Cl. X.R.

174—68, 88